United States Patent
Wilson et al.

(10) Patent No.: US 10,810,285 B2
(45) Date of Patent: **\*Oct. 20, 2020**

(54) MOBILE VIRTUAL COMMUNICATION AND ENTERTAINMENT SERVICE

(71) Applicant: AT&T Intellectual Property I, L.P., Atlanta, GA (US)

(72) Inventors: Brian Wilson, Johnston, IA (US); Arvind Ramdas Mallya, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/912,055

(22) Filed: Mar. 5, 2018

(65) Prior Publication Data
US 2018/0199092 A1 Jul. 12, 2018

Related U.S. Application Data

(63) Continuation of application No. 15/171,825, filed on Jun. 2, 2016, now Pat. No. 9,942,594, which is a (Continued)

(51) Int. Cl.
*H04L 29/06* (2006.01)
*G06F 21/10* (2013.01)
(Continued)

(52) U.S. Cl.
CPC .............. *G06F 21/10* (2013.01); *G06F 21/31* (2013.01); *H04L 63/0853* (2013.01);
(Continued)

(58) Field of Classification Search
CPC ..... H04L 63/08; H04L 63/0853; H04L 63/10; G06F 21/31; G06F 21/44; G06F 21/34; G06F 21/77
See application file for complete search history.

(56) References Cited

U.S. PATENT DOCUMENTS 7,624,417 B2 * 11/2009 Dua .................. H04L 29/06027
725/114
7,739,153 B1 6/2010 Anderson et al.
(Continued)

FOREIGN PATENT DOCUMENTS

KR 10-2005-0107693 11/2005

OTHER PUBLICATIONS

Yu, Changgeng, "Authentication Methods Based on Digital Fingerprint Random Encryption IBC", Journal of Software 9.6 (2014): 1612-1618.

*Primary Examiner* — Hosuk Song
(74) *Attorney, Agent, or Firm* — Guntin & Gust, PLC; Ralph Trementozzi

(57) ABSTRACT

Aspects of the subject disclosure may include, for example, a method including providing, by a processor in a dongle coupled to a display device, a graphical user interface at the display device, and transmitting a message to an authentication server in accordance with authentication information stored in a storage device of the dongle and an input via the graphical user interface. The method also includes obtaining an authentication confirmation; obtaining content from a content server; and recording the content in accordance with a second input via the graphical user interface. The recorded content is transmitted for storage at a storage server. The display device communicates with equipment of a video provider that is associated with a service area. In accordance with the authentication confirmation, the processor is authorized to obtain the content based on the location of the dongle relative to the service area. Other embodiments are disclosed.

20 Claims, 8 Drawing Sheets

Related U.S. Application Data continuation of application No. 14/482,807, filed on Sep. 10, 2014, now Pat. No. 9,391,984.

(51) Int. Cl.
| | |
|---|---|
| *G06F 21/31* | (2013.01) |
| *H04W 12/06* | (2009.01) |
| *H04N 21/254* | (2011.01) |
| *H04N 21/4147* | (2011.01) |
| *H04N 21/418* | (2011.01) |
| *H04N 21/431* | (2011.01) |
| *H04N 21/433* | (2011.01) |
| *H04N 21/44* | (2011.01) |
| *H04N 21/442* | (2011.01) |

(52) U.S. Cl.
CPC ...... *H04L 63/0876* (2013.01); *H04L 63/0892* (2013.01); *H04L 63/107* (2013.01); *H04N 21/2541* (2013.01); *H04N 21/418* (2013.01); *H04N 21/4147* (2013.01); *H04N 21/431* (2013.01); *H04N 21/4334* (2013.01); *H04N 21/44004* (2013.01); *H04N 21/44204* (2013.01); *H04W 12/0602* (2019.01); *H04W 12/0608* (2019.01)

(56) References Cited

U.S. PATENT DOCUMENTS

| | | |
|---|---|---|
| 7,996,869 B2 | 8/2011 | Tu et al. |
| 8,069,465 B1 | 11/2011 | Bartholomay et al. |
| 8,078,696 B2 | 12/2011 | LaJoie et al. |
| 8,181,206 B2 | 5/2012 | Hasek |
| 8,219,636 B2 | 7/2012 | Velusamy et al. |
| 8,341,246 B2 | 12/2012 | LaJoie et al. |
| 8,370,906 B2 * | 2/2013 | Wen ............... H04L 63/08 717/120 |
| 8,484,687 B2 | 7/2013 | Dasher et al. |
| 8,572,257 B2 | 10/2013 | Dua |
| 8,667,168 B2 * | 3/2014 | Ryu ............... H04L 12/64 370/229 |
| 8,941,709 B2 * | 1/2015 | Johnson ............ G06Q 20/18 348/14.01 |
| 9,171,017 B2 | 10/2015 | Heynen et al. |
| 9,391,984 B2 | 7/2016 | Mallya et al. |
| 9,628,866 B2 | 4/2017 | Kasatani et al. |
| 9,942,594 B2 * | 4/2018 | Wilson ............ H04L 63/0892 |
| 10,275,370 B2 * | 4/2019 | Perez .............. G06F 21/31 |
| 2008/0109838 A1 | 5/2008 | Zureczki et al. |
| 2008/0235590 A1 | 9/2008 | Krantz et al. |
| 2010/0241699 A1 | 9/2010 | Muthukumarasamy et al. |
| 2011/0119495 A1 | 5/2011 | Daoud et al. |
| 2012/0174177 A1 | 7/2012 | Bartholomay et al. |
| 2013/0060704 A1 | 3/2013 | Read |
| 2016/0277782 A1 | 9/2016 | Wilson et al. |

\* cited by examiner

100

200

300

400

MOBILE VIRTUAL COMMUNICATION AND ENTERTAINMENT SERVICE

CROSS-REFERENCE TO RELATED APPLICATIONS

This application is a Continuation of and claims priority to U.S. patent application Ser. No. 15/171,825 filed Jun. 2, 2016, which is a Continuation of and claims priority to U.S. patent application Ser. No. 14/482,807 filed Sep. 10, 2014. All sections of the aforementioned application(s) and patent(s) are incorporated herein by reference in their entirety.

FIELD OF THE DISCLOSURE

The subject disclosure relates to a mobile virtual communication and entertainment service.

BACKGROUND

Video content providers typically send content to display devices of consumers located in defined service areas via wired or wireless connections. A consumer may use a digital video recorder (DVR), co-located with the display device, to record desired content.

BRIEF DESCRIPTION OF THE DRAWINGS

Reference will now be made to the accompanying drawings, which are not necessarily drawn to scale, and wherein.

DETAILED DESCRIPTION

Figure 1:
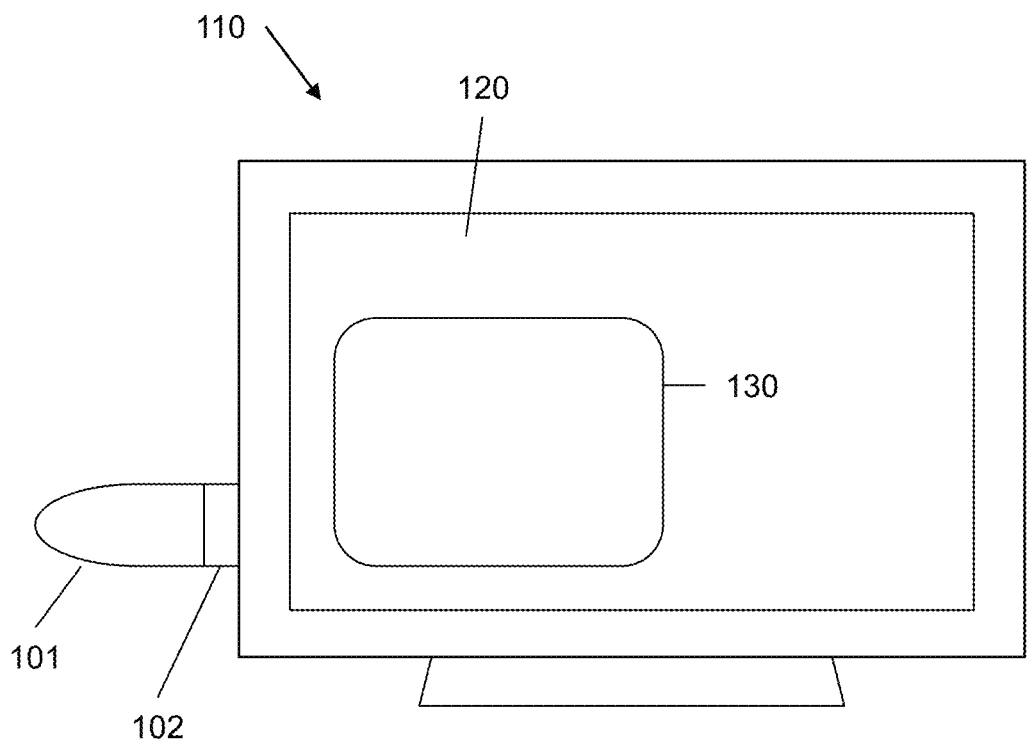
FIG. 1 schematically illustrates a display device displaying a graphical user interface, a user-operated remote control, and a USB dongle connected to the display device, in accordance with an embodiment of the disclosure.
Figure 1:
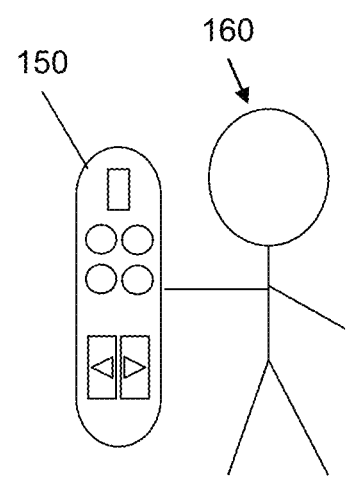

The subject disclosure describes, among other things, illustrative embodiments for virtualization of DVR functionality, using a USB dongle that is portable between display devices. Other embodiments are described in the subject disclosure.

One or more aspects of the subject disclosure include software for a virtual DVR is located on a USB dongle that can be connected to any media display device (television, laptop, tablet, etc.). The dongle can obtain media content from a cloud server at any location; media access is not limited to the particular service area of a video provider. In particular embodiments, the USB dongle is Ethernet based and includes a graphical user interface (GUI) providing functionality similar to that of a conventional set top box. The display device with the USB dongle can receive content from a content server and store recorded content in a storage server.

One embodiment of the subject disclosure includes a device comprising a memory to store instructions and a controller coupled to the memory. The controller, responsive to executing the instructions, performs operations. The operations include providing a graphical user interface at a display device, and transmitting an authentication message to a remote authentication server in accordance with authentication information stored in the memory and a first input via the graphical user interface. The operations also include obtaining an authentication confirmation from the authentication server, obtaining content from a remote content server, and recording the content in accordance with a second input via the graphical user interface. The operations further include transmitting the recorded content for storage at a remote storage server. The device also comprises a global positioning system for determining a location for the device. The device comprises a dongle having a connector for connecting to the display device; the display device is a subscriber device communicating with equipment of a video provider, the video provider being associated with a service area. The authentication information comprises information regarding specified media channels. In accordance with the authentication confirmation, the device is authorized to obtain content via the specified media channels based on the location of the device relative to the service area. The device communicates with the content server and the storage server via the internet.

One embodiment of the subject disclosure includes a computer-readable storage device comprising instructions which, when executed by a processor, cause the processor to perform operations. The operations comprise providing a graphical user interface at a display device; the storage device is coupled to the display device. The operations also comprise transmitting an authentication message to a remote authentication server in accordance with authentication information stored in the storage device and a first input via the graphical user interface, and obtaining an authentication confirmation from the authentication server. The operations also comprise obtaining content from a remote content server, recording the content in accordance with a second input via the graphical user interface, and transmitting the recorded content for storage at a remote storage server. The operations further comprise obtaining a location for the storage device. The display device is a subscriber device communicating with equipment of a video provider; the authentication information comprises information regarding specified media channels; and in accordance with the authentication confirmation, the processor is authorized to obtain content via the specified media channels based on the location of the storage device.

One embodiment of the subject disclosure includes a method comprising providing, by a processor in a dongle coupled to a display device, a graphical user interface at the display device, and transmitting, by the processor, an authentication message to a remote authentication server in accordance with authentication information stored in a storage device of the dongle and a first input via the graphical user interface. The method also comprises obtaining, by the processor, an authentication confirmation from the authentication server; obtaining, by the processor, content from a remote content server; and recording, by the processor, the content in accordance with a second input via the graphical user interface. The method further comprises transmitting, by the processor, the recorded content for storage at a remote storage server; and obtaining, by the processor, a location for the storage device. The display device is a subscriber device communicating with equipment of a video provider, and the video provider is associated with a service area. In accordance with the authentication confirmation, the processor is authorized to obtain the content based on the location of the dongle relative to the service area.

FIG. 1 depicts an illustrative embodiment of a video display and recording system 100, in which a dongle 101 with a connector 102 (e.g., a USB connector) connects to a display device 110 having a display screen 120. The USB dongle 101 includes software for performing various functions detailed below. In this embodiment, the USB dongle includes software to provide a graphical user interface (GUI) that is displayed on a portion 130 of the display screen. A user 160 can control the display device with a remote control 150. In this embodiment, the user can make inputs to the GUI by pressing one or more buttons on the remote control 150. In an alternative embodiment, the portion 130 of the display screen corresponding to the GUI can function as a touchscreen accepting inputs directly from the user.

The software of USB dongle 101 provides a virtual digital video recorder. In response to execution of the virtual DVR software, an incoming audio/video signal can be stored in the dongle 101 while being viewed, while content on another channel is being viewed, and/or while no content is being displayed. Content also can be retrieved from storage (e.g., local and/or remote storage) for viewing while the incoming signal is stored for future use. Storage in the dongle 101 need not hold an entire program, but can be sufficient to buffer content arriving from or being sent to content or storage servers (e.g., cloud servers).

The virtual DVR is controlled via the GUI displayed on the display device. In response to inputs to the GUI, the virtual DVR performs various DVR functions such as record, play, stop, rewind, fast forward, etc.

In an embodiment, the USB dongle 101 is installed and configured by the user 160. Alternatively, the USB dongle can be configured by a provider (e.g. a video services provider) before delivery to the user.

Figure 2:
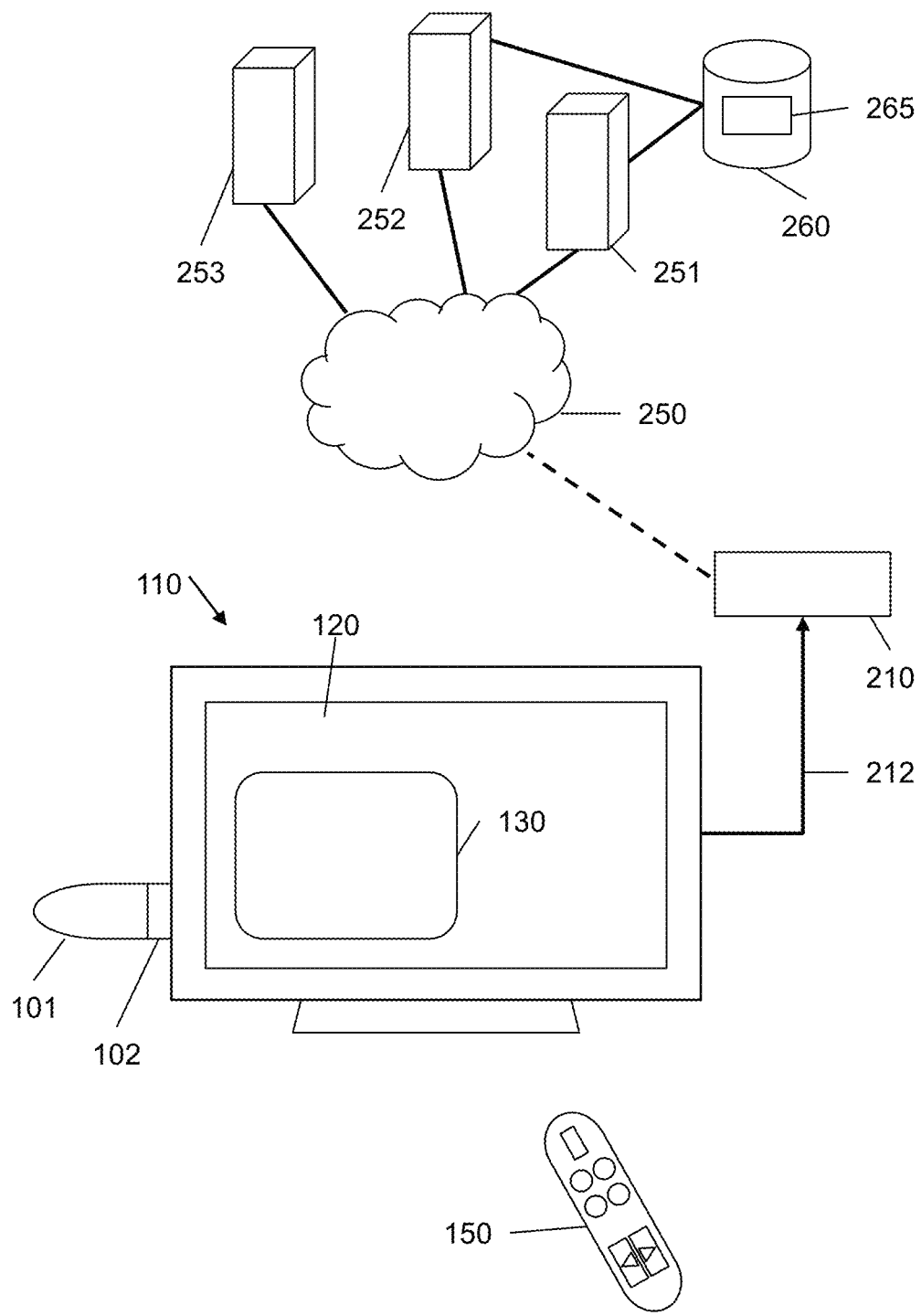
FIG. 2 schematically illustrates the display device and USB dongle of FIG. 1 in communication with application, content and authorization servers, in accordance with an embodiment of the disclosure.

FIG. 2 depicts an illustrative embodiment of a virtual DVR system 200 communicating with servers via the internet. In this embodiment, USB dongle 101 is coupled to display device 110 by USB connector 102, display device 110 is located at a residence, and the display device is coupled to a residential gateway 210 by an Ethernet connection 212. In another embodiment, display device 110 may have a wireless connection to the residential gateway 210. In a further embodiment, display device 110 may have an Ethernet connection to a wireless-ready access point communicating with the residential gateway via a WiFi connection.

As shown in FIG. 2, USB dongle 101 and display device 110 communicate with servers 251, 252, 253 and storage device 260 via a network 250. Network 250 can be the Internet, a service provider network, or some other form of access network (see FIG. 6). In an embodiment, server 251 is an application server maintained by a video service provider, for receiving and managing content requests transmitted from the USB dongle; application server 251 communicates with content server 252 and authentication server 253. Content server 252 can stream live content to the display device (via the network and residential gateway), or retrieve content from storage device 260 in accordance with a request from USB dongle 101.

Authentication server 253 can maintain credentials for the USB dongle. In this embodiment, the USB dongle includes a storage device in which authentication credentials (including, for example, user account information) are pre-loaded when the dongle is delivered to the user. The dongle credentials may be verified at any time by querying the authentication server. In further embodiments, the dongle credentials are portable to other devices; the user may install the dongle in a different device (tablet, phone, laptop, etc.) without having to perform an authentication procedure. The user account information can be permanently stored on the USB dongle, so that authorizations or restrictions on use of the dongle applicable to the user are recognized at any device where the dongle is installed. In an embodiment, the USB dongle includes a SIM card with information specific to the user.

In other embodiments, the USB dongle 101 can include additional features to prevent unauthorized use. For example, the dongle can incorporate a fingerprint reader and store the fingerprint of user 160, so that only user 160 is permitted to install the dongle at the display device 110.

Storage device 260 can include a reserved storage area 265 associated with USB dongle 101 and user 160. Content recorded by the virtual DVR of the dongle software (in accordance with user input via GUI 130) is stored in user storage area 265. In an embodiment, the user purchases a certain amount of storage along with the authenticated USB dongle, and may purchase additional storage as desired.

In another embodiment, the credentials for the USB dongle are validated only for certain channels; that is, the dongle is authorized for use only on channels specified by the provider. In a further embodiment, the user may specify channels where use is permitted; this information can be associated with user account information at the authentication server and/or stored with user information on a SIM card incorporated in the dongle. The dongle credentials can also specify storage limitations; for example, if a requested recording of a program will exceed available storage in area 265, the recording may not be performed. Alternatively, the user can be automatically charged for additional storage at the time the recording is requested.

Figure 3:
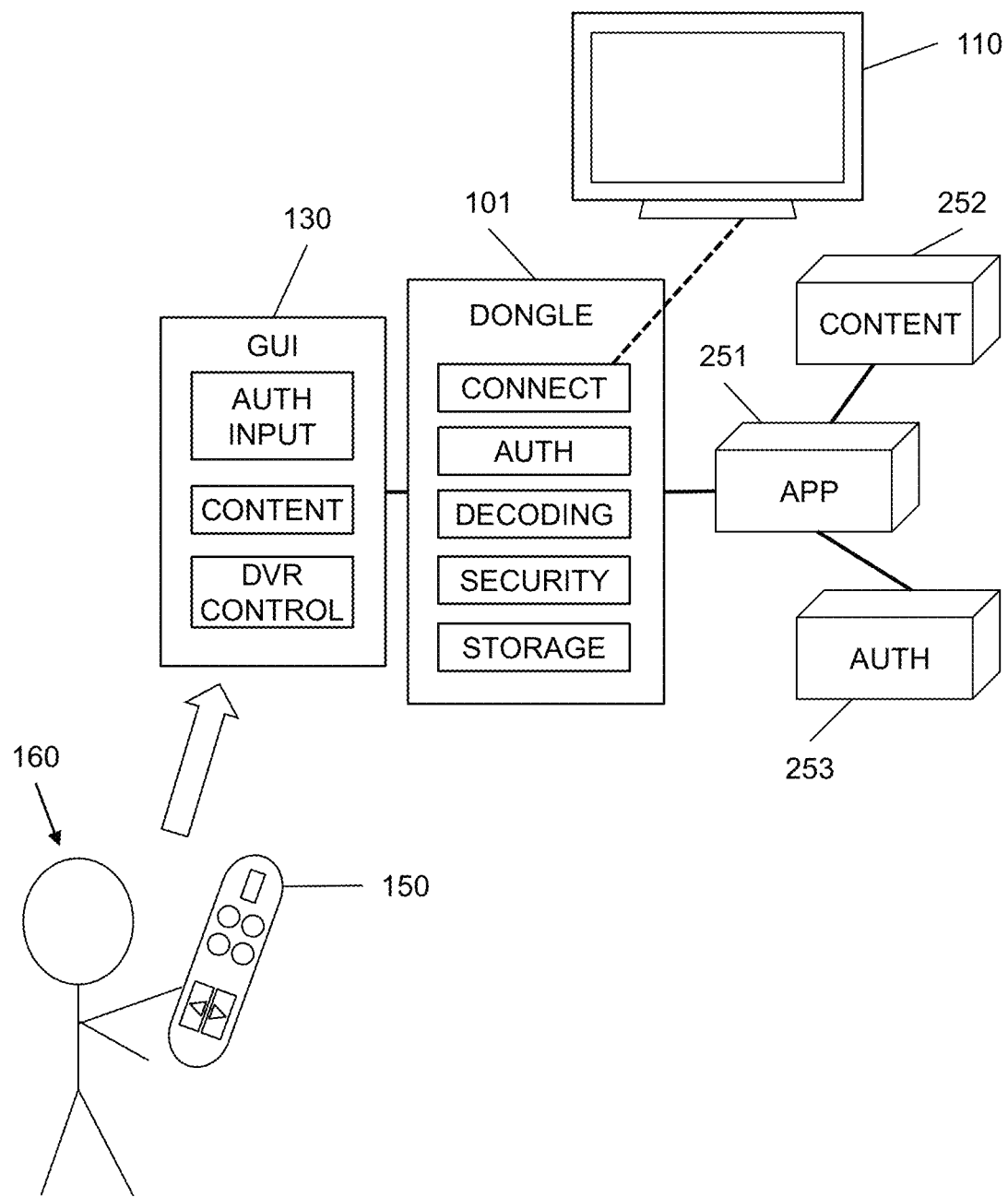
FIG. 3 depicts an illustrative embodiment of software functions of the graphical user interface and the USB dongle.

FIG. 3 schematically illustrates software functions of the GUI 130 and the USB dongle 101, in accordance with an embodiment 300 of the disclosure. As shown in FIG. 3, user 160 provides inputs to GUI 130, either directly at a touchscreen of the display device or by signals from remote control 150. In this embodiment, inputs to the GUI can be for authentication (e.g. entering a password or setup code when the dongle is first installed), to request recording of new content or playback of previously recorded content, or to perform DVR control functions (play, pause, fast forward, etc.). The software of the USB dongle 101 provides connectivity to various display devices including device 110); causes authentication messages to be sent to and received from the authentication server 253; decodes streamed or retrieved content sent from the content server 252; provides security by blocking recording of unauthorized channels or by unauthorized users; and transmits content to the application server 251 for storage.

It will be appreciated that the USB dongle, as shown in FIG. 3, provides a client device for delivering content to the user. The USB dongle also provides local and cloud-based content storage while being portable.

Figure 4:
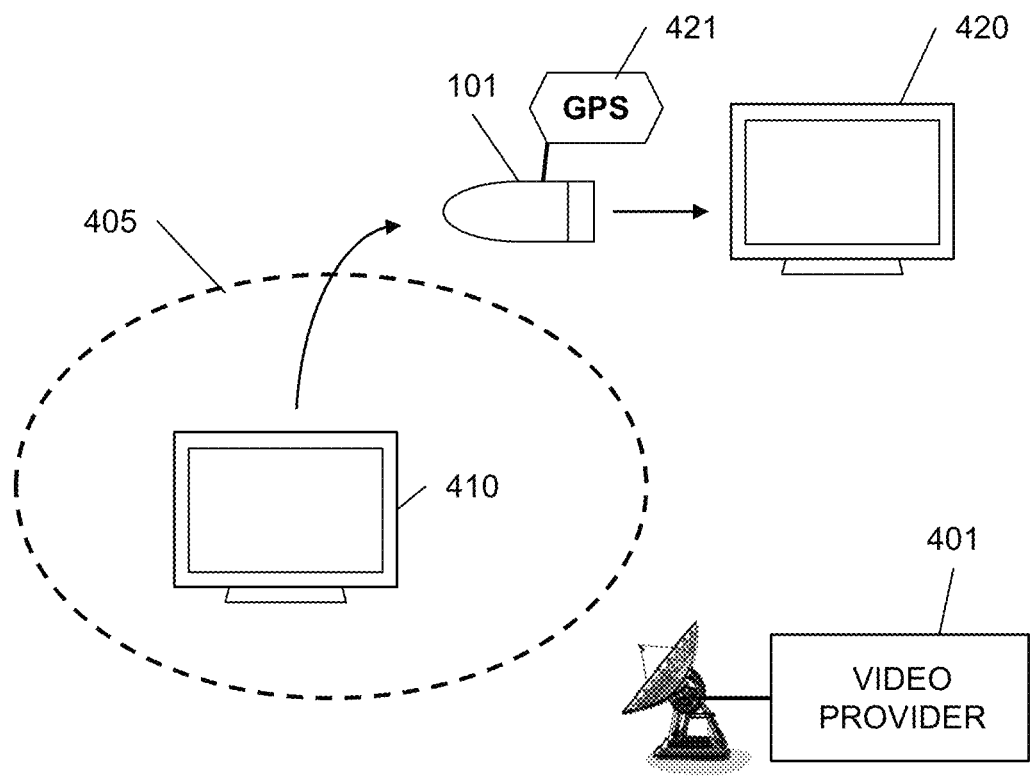
FIG. 4 schematically illustrates a USB dongle that is portable outside a service area of a video provider, in accordance with an embodiment of the disclosure.

FIG. 4 schematically illustrates a system 400 showing portability of USB dongle 101, in accordance with an embodiment of the disclosure. As shown in FIG. 4, video provider 401 sends broadcast signals to subscribers in a defined service area 405. In this embodiment, a USB dongle installed at display device 410, located within service area 405, can be authenticated and configured to receive and record content from provider 401. If USB dongle 101 is then disconnected and moved to another display device 420, the dongle software can cause content of video provider 401 to be displayed at device 420. In this embodiment, the dongle can obtain media content from a cloud server at any location, and it not limited to any provider service area. For example, dongle 101, after installation at device 420, can send a request to server 251 to obtain content stored in user area 265 and then display that content on device 420.

In this embodiment, authentication of the USB dongle remains valid after the dongle is disconnected and then installed on new device 420. In other embodiments, authentication server 253 may send a message via display device 420, requiring the user to verify the credentials of USB dongle 101.

In a further embodiment, USB dongle 101 can be provided with a global positioning system (GPS) receiver 421, as shown schematically in FIG. 4. The GPS receiver determines the location of the USB dongle when the dongle is powered by a media device. Accordingly, in this embodiment the GPS can detect that the dongle has been moved from an original location within area 405 to a new location outside area 405. Depending on the configuration of the dongle (which may be determined at the time of purchase or delivery of the dongle), the dongle may be deactivated when moved outside service area 405. In another embodiment, the GPS may determine the distance from the new location (device 420) to the original location (device 410); the dongle software may then either permit or prevent use of the dongle depending on the distance.

Figure 5:
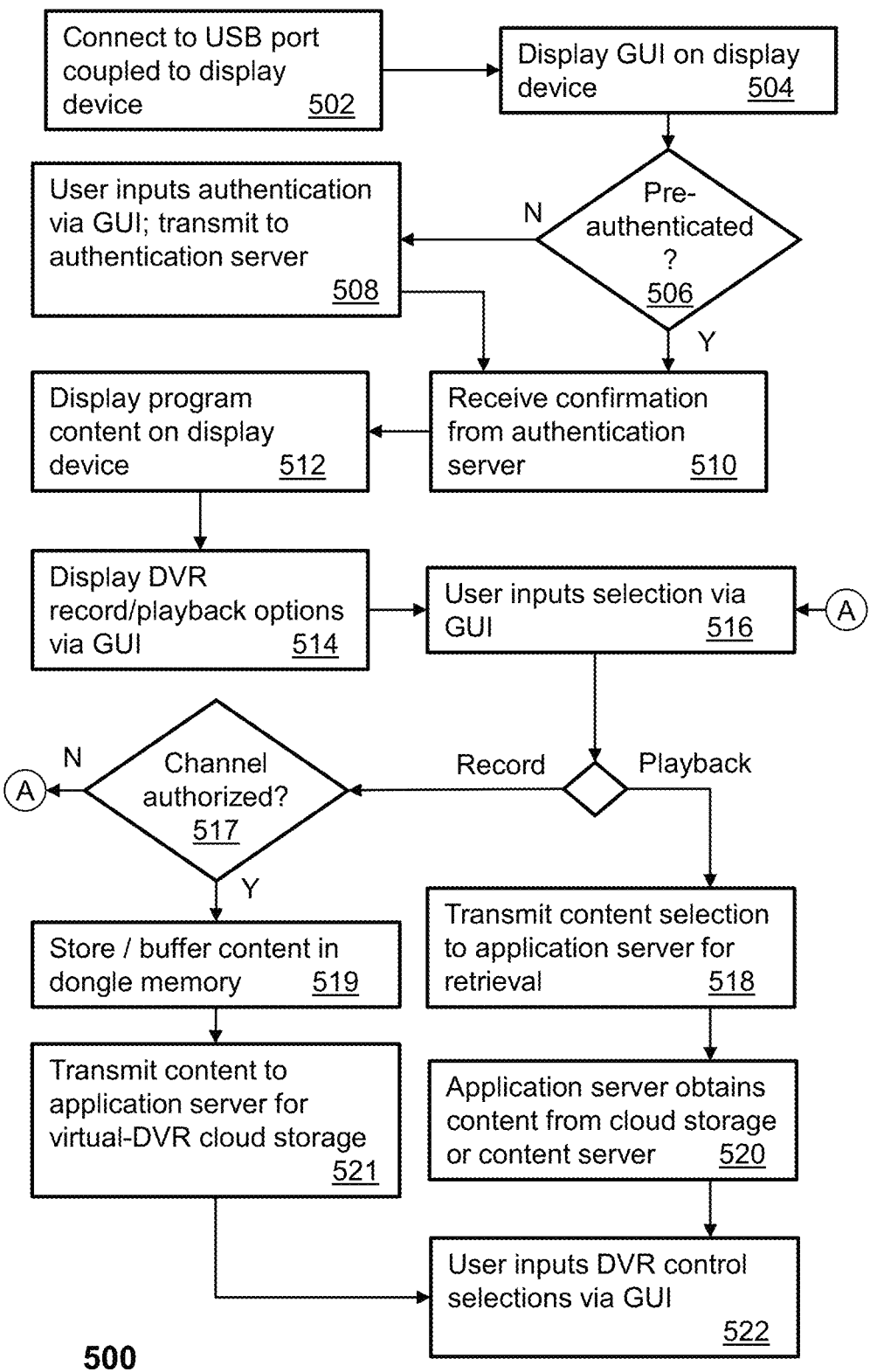
FIG. 5 depicts an illustrative embodiment of a method used in portions of the system described in FIGS. 1-3.

FIG. 5 shows a flowchart depicting an illustrative embodiment of a method 500 for using a virtual DVR client on a USB dongle. The USB connector 102 of the dongle is connected to a USB port coupled to a display device (step 502), which causes a GUI to be displayed at the display device (step 504). If the USB dongle has been pre-authenticated, for example by authentication information loaded on the dongle's storage upon delivery to the user (step 506), the dongle can automatically transmit a message to the authentication server and receive confirmation that the dongle is ready for use (step 512). Otherwise (step 508), the user inputs information via the GUI to authenticate the dongle.

The display device presents program content (step 512), and also displays a GUI for inputting DVR content requests and/or DVR control instructions (step 514). In accordance with the user input via the GUI (step 516), the dongle software performs a recording function or requests retrieval of content for playback. If the user requests a recording of content on a channel, the dongle software determines whether recording is authorized for that channel (step 517). If so, the content is recorded by the dongle (step 519) and transmitted to the application server for storage (step 521).

If the user requests playback of content, the content selection is transmitted to the application server (step 518). The application server obtains the requested content from the storage server or the content server step 520). The user controls the recording and/or playback by inputting instructions via the GUI (step 522).

Figure 6:
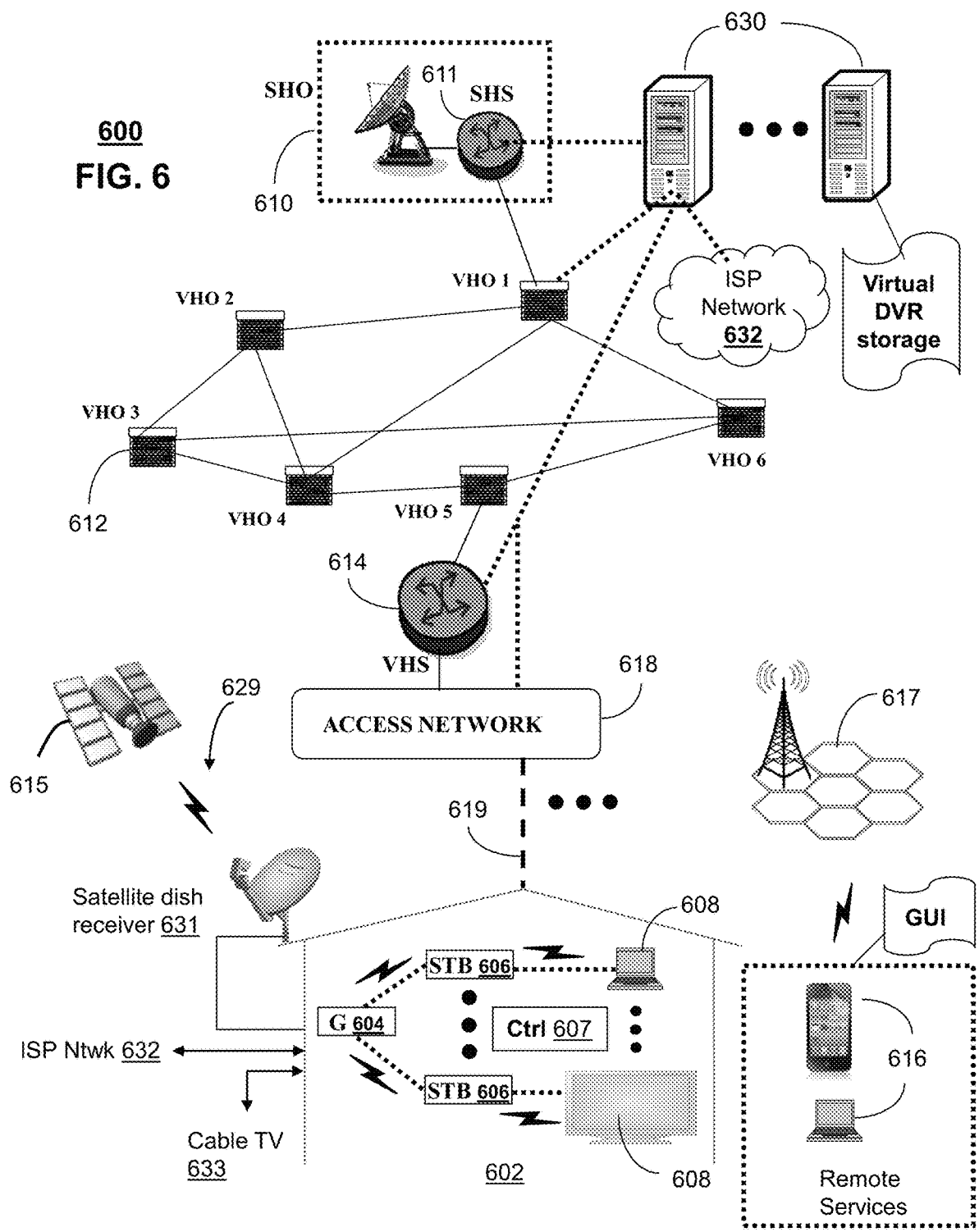
FIG. 6 depicts an illustrative embodiment of a communication system that provides media services to the display device and USB dongle of FIGS. 1-4.

FIG. 6 depicts an illustrative embodiment of a first communication system 600 for delivering media content. The communication system 600 can represent an Internet Protocol Television (IPTV) media system. Communication system 600 can be overlaid or operably coupled with systems 100, 200 and/or 400 of FIGS. 1, 2 and/or 4 as another representative embodiment of communication system 600. For instance, one or more devices illustrated in the communication system 600 of FIG. 6 can include a device comprising a memory to store instructions and a controller coupled to the memory, where the controller, responsive to executing the instructions, performs operations. The operations can include providing a graphical user interface at a display device, and transmitting an authentication message to a remote authentication server in accordance with authentication information stored in the memory and a first input via the graphical user interface. The operations can also include obtaining an authentication confirmation from the authentication server, obtaining content from a remote content server, and recording the content in accordance with a second input via the graphical user interface. The operations can further include transmitting the recorded content for storage at a remote storage server. The device can also include a global positioning system for determining a location for the device. The device comprises a dongle having a connector for connecting to the display device; the display device is a subscriber device communicating with equipment of a video provider, the video provider being associated with a service area. The authentication information comprises information regarding specified media channels. In accordance with the authentication confirmation, the device is authorized to obtain content via the specified media channels based on the location of the device relative to the service area. The device communicates with the content server and the storage server via the internet.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as an application server, content server, or authentication server (herein referred to as server 630). The server 630 can use computing and communication technology to perform content delivery and storage functions which can include among other things, the server functions described with reference to FIGS. 2-3. The media processors 606 and wireless communication devices 616 can be provisioned with software functions to utilize the services of server 630.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

It will be appreciated that various communication networks and protocols can be utilized for delivery of content via the dongle 101, including an IP Multimedia Subsystem (IMS) network that combines packet-switched and circuit-switched technologies.

Figure 7:
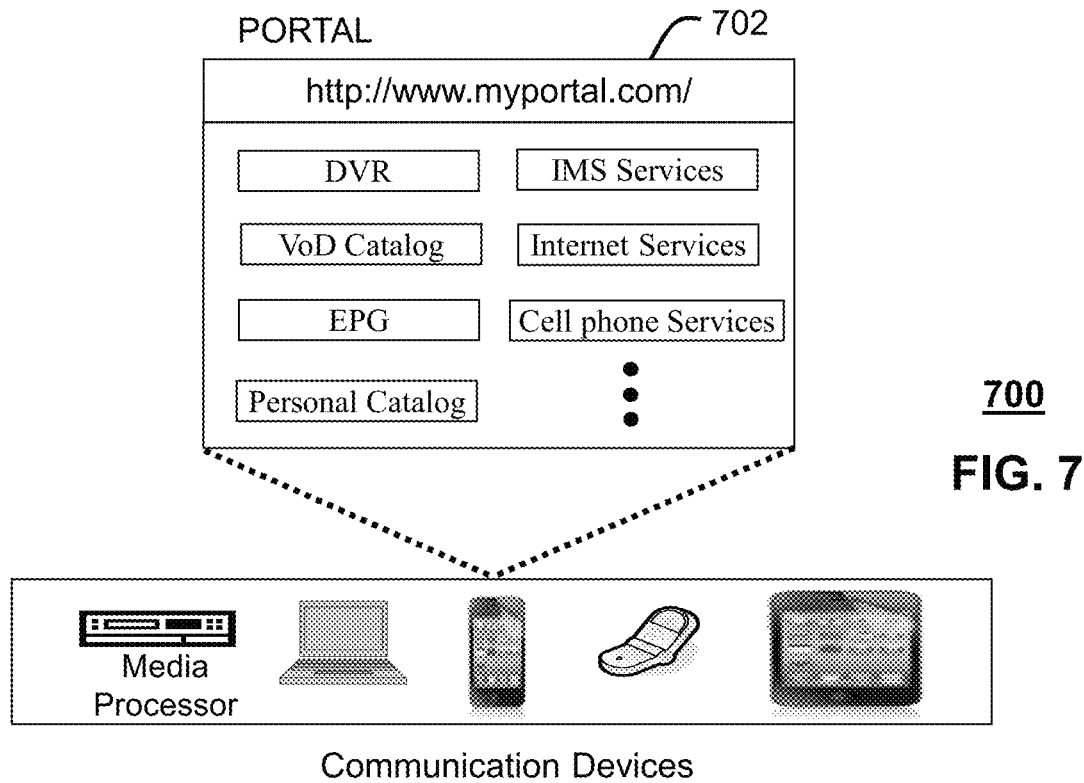
FIG. 7 depicts an illustrative embodiment of a web portal for interacting with the communication systems of FIGS. 1-4 and 6.

FIG. 7 depicts an illustrative embodiment of a web portal 702 of a communication system 700. Communication system 700 can be overlaid or operably coupled with systems 100, 200 and/or 400 of FIGS. 1, 2 and/or 4, and/or communication system 600 as another representative embodiment of communication system 600. The web portal 702 can be used for managing services of systems 100, 200 and/or 400 of FIGS. 1, 2 and/or 4 and communication systems 600-700. A web page of the web portal 702 can be accessed by a Uniform Resource Locator (URL) with an Internet browser using an Internet-capable communication device such as those described in FIG. 6. The web portal 702 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 702 can also be used for provisioning IMS services described earlier, provisioning Internet services, provisioning cellular phone services, and so on.

The web portal 702 can further be utilized to manage and provision software applications to adapt these applications as may be desired by subscribers and/or service providers of communication systems 600-700. Service providers can log onto an administrator account to provision, monitor and/or maintain the systems 200, 600, 700 or server 630.

Figure 8:
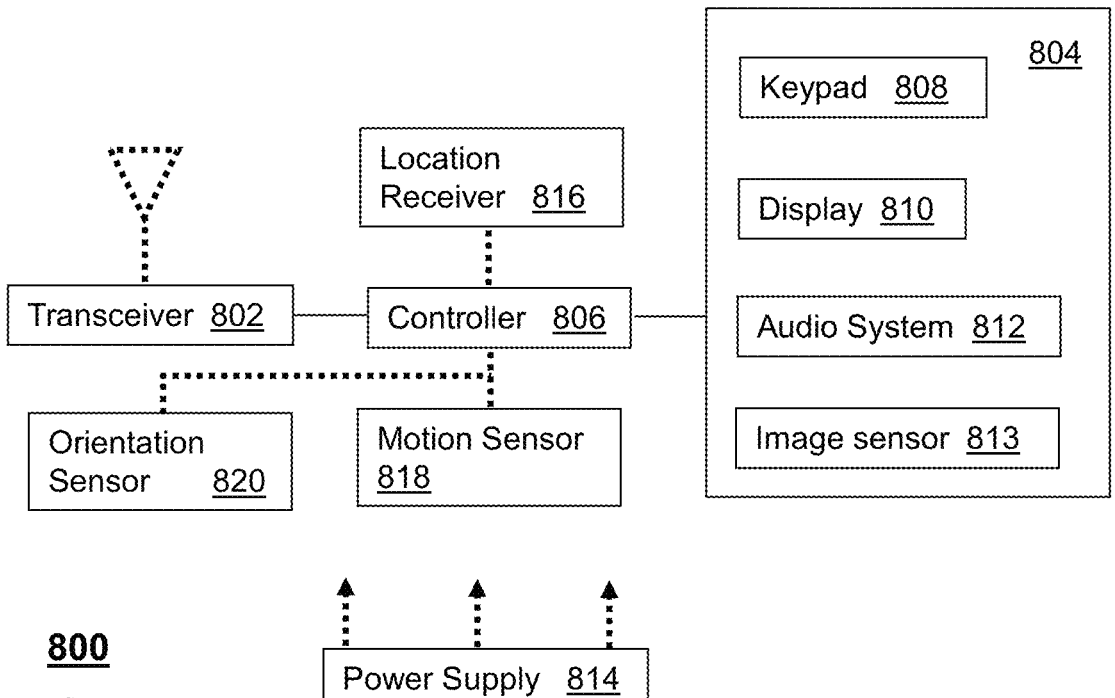
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIG. 6. Communication device 800 in whole or in part can represent any of the communication devices described in FIG. 6 and can be configured to perform portions of method 500 of FIG. 5.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of the media processor 606, the media devices 608, or the portable communication devices 616 of FIG. 6. The communication device 800 can be adapted to display recorded content and/or provide a GUI for controlling a virtual DVR as described above. It will be appreciated that the communication device 800 can also represent other devices that can operate in communication system 600 of FIG. 6 such as a gaming console and a media player.

Upon reviewing the aforementioned embodiments, it would be evident to an artisan with ordinary skill in the art that said embodiments can be modified, reduced, or enhanced without departing from the scope of the claims described below.

For example, the dongle 101 can provide HD services (and SD services) to a display device without utilizing an HDMI cable. The dongle 101 can enable local and cloud-based video content storage and media buffering. In one or more embodiments, the dongle 101 can receive content from other end user devices (e.g., a mobile device in proximity to the dongle) such that the dongle can present (on the display device) content that is stored on or otherwise accessible to the mobile device. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
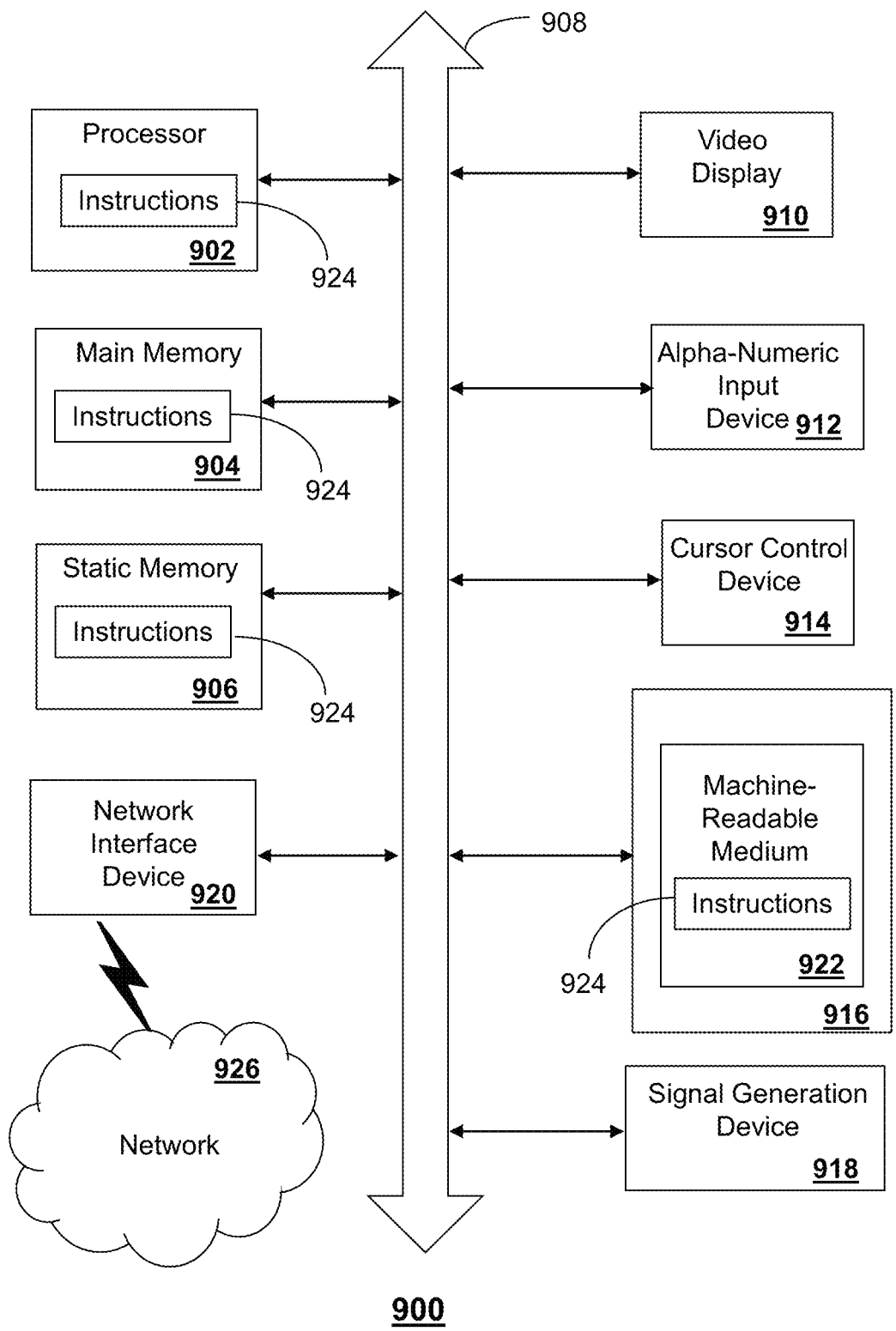
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the server 630, the servers 251-253, the storage device 260, and other devices of FIGS. 1-4. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
    a memory that stores instructions; and
    a processing system including a processor coupled to the memory, wherein responsive to executing the instructions, the processing system performs operations comprising:
        communicatively coupling to a port of a display device;
        obtaining media content based on a location of the device relative to a service area;
        buffering the media content during a first presentation of another media content on the display device resulting in buffered media content;
        presenting a second presentation of the buffered media content; and
        modifying presentation of the buffered media content responsive to user input from a graphical user interface presented on the display device.

2. The device of claim 1, wherein the operations further comprise authenticating based on the location of the device using a global positioning system wherein responsive to being authenticated, receiving authorization to obtain the media content based on the location of the device relative to the service area.

3. The device of claim 2, wherein the media content is obtained via specified media channels.

4. The device of claim 1, wherein the operations further comprise presenting the graphical user interface at the display device.

5. The device of claim 1, wherein the operations further comprise transmitting the buffered media content for storage at a remote storage server.

6. The device of claim 1, wherein the display device comprises a mobile device.

7. The device of claim 6, wherein the operations further comprise authenticating of the device based on authentication information stored in memory of the mobile device.

8. The device of claim 7, wherein the authentication information further comprises personal identifying information of a user of the mobile device.

9. The device of claim 8, wherein the memory further comprises a subscriber identity module (SIM) card for storing the personal identifying information.

10. The device of claim 1, wherein the device remains authenticated subsequent to connection to a second display device located outside the service area.

11. A non-transitory machine-readable storage medium, comprising executable instructions that, when executed by a processing system including a processor, facilitate performance of operations, comprising:
    communicatively coupling to a port of a mobile device;
    obtaining media content based on a location of the processing system relative to a service area;
    buffering the media content during a first presentation of another media content on the mobile device resulting in buffered media content;
    presenting a second presentation of the buffered media content; and
    modifying presentation of the buffered media content responsive to user input from a graphical user interface presented on the mobile device.

12. The machine-readable storage medium of claim 11, wherein the operations further comprise authenticating of the processing system based on authentication information stored in memory of the mobile device and comprises personal identifying information of a user of the mobile device.

13. The machine-readable storage medium of claim 12, wherein the memory further comprises a subscriber identity module (SIM) card for storing the personal identifying information.

14. A method, comprising:
communicatively coupling, by a processing system, including a processor, to a port of a display device;
obtaining, by the processing system, media content based on a location of the processing system relative to a service area;
buffering, by the processing system, the media content during a first presentation of another media content on the display device resulting in buffered media content;
presenting, by the processing system, a second presentation of the buffered media content; and
modifying, by the processing system, the second presentation of the buffered media content responsive to user input from a graphical user interface presented on the display device.

15. The method of claim 14, further comprising authenticating, by the processing system, based on the location of the processing system using a global positioning system wherein responsive to being authenticated, receiving authorization to obtain the media content based on the location of the processing system relative to the service area.

16. The method of claim 15, wherein the media content is obtained via specified media channels.

17. The method of claim 14, further comprising presenting, by the processing system, the graphical user interface at the display device.

18. The method of claim 14, wherein the processing system remains authenticated subsequent to connection to a second display device located outside the service area.

19. The method of claim 14, wherein the display device further comprises a mobile device.

20. The method of claim 19, further comprising authenticating, by the processing system, is based on authentication information stored in memory of the mobile device and comprises personal identifying information of a user of the mobile device.

\* \* \* \* \*